United States Patent
Canfield et al.

(10) Patent No.: US 12,407,669 B2
(45) Date of Patent: Sep. 2, 2025

(54) SYSTEM AND METHODS FOR USING A TRUSTED SINGLE WEB PORTAL FOR ACCESSING MULTIPLE WEB SERVICES

(71) Applicant: Traitware inc., Nevada City, CA (US)

(72) Inventors: Christopher M. Canfield, Nevada City, CA (US); Todd Hickerson, Nevada City, CA (US); Herbert W. Spencer, III, Nevada City, CA (US)

(73) Assignee: California, Reno, NV (US)

( * ) Notice: Subject to any disclaimer, the term of this patent is extended or adjusted under 35 U.S.C. 154(b) by 625 days.

(21) Appl. No.: 17/455,002

(22) Filed: Nov. 15, 2021

(65) Prior Publication Data
US 2022/0150237 A1 May 12, 2022

Related U.S. Application Data

(63) Continuation of application No. PCT/US2020/033063, filed on May 15, 2020.

(60) Provisional application No. 62/848,228, filed on May 15, 2019.

(51) Int. Cl.
*H04L 9/40* (2022.01)

(52) U.S. Cl.
CPC ...... *H04L 63/0815* (2013.01); *H04L 63/0838* (2013.01); *H04L 63/102* (2013.01); *H04L 63/104* (2013.01)

(58) Field of Classification Search
CPC ............. H04L 63/0815; H04L 63/0838; H04L 63/102; H04L 63/104; G06F 21/31
See application file for complete search history.

(56) References Cited

U.S. PATENT DOCUMENTS

| | | | | |
|---|---|---|---|---|
| 9,077,713 B1* | 7/2015 | Zheng | | G06F 21/30 |
| 9,614,828 B1* | 4/2017 | Golwalkar | | G06Q 30/0609 |
| 10,019,567 B1* | 7/2018 | Allen | | G06F 21/46 |
| 10,721,226 B1* | 7/2020 | Kurani | | H04L 63/0861 |
| 10,880,284 B1* | 12/2020 | Hitchcock | | H04L 63/102 |
| 11,763,303 B1* | 9/2023 | Kurani | | G06Q 20/3821 |
| | | | | 705/39 |
| 2014/0033286 A1* | 1/2014 | Zhang | | H04W 12/06 |
| | | | | 726/7 |
| 2014/0189808 A1* | 7/2014 | Mahaffey | | G06F 21/6245 |
| | | | | 726/4 |
| 2016/0337351 A1* | 11/2016 | Spencer | | H04L 63/0876 |
| 2017/0109742 A1* | 4/2017 | Varadarajan | | G06F 21/32 |
| 2017/0324737 A1* | 11/2017 | Evans | | H04L 63/0272 |
| 2017/0346850 A1* | 11/2017 | Jin | | G06F 21/00 |
| 2018/0026973 A1* | 1/2018 | Le Saint | | G06F 21/35 |
| 2018/0322502 A1* | 11/2018 | Weller | | G06Q 20/3274 |
| 2019/0258818 A1* | 8/2019 | Yu | | G06F 21/44 |

(Continued)

FOREIGN PATENT DOCUMENTS

WO WO-2018198036 A1 * 11/2018

*Primary Examiner* — Jason Chiang
(74) *Attorney, Agent, or Firm* — Kari L. Barnes

(57) ABSTRACT

Exemplary methods and systems described herein include using a single portal application for accessing a plurality of secure resources. The system and methods may use a second authentication application for selecting a desired secure resource and authenticating a user. The systems and methods may authenticate a user using different credentials for different secure resource without requiring the user to enter a unique credential for a given secure resource.

23 Claims, 7 Drawing Sheets

(56) References Cited

U.S. PATENT DOCUMENTS

| | | | |
|---|---|---|---|
| 2019/0289017 A1* | 9/2019 | Agarwal | H04L 9/0643 |
| 2021/0152365 A1* | 5/2021 | Nosseir | H04L 9/321 |
| 2022/0150237 A1* | 5/2022 | Canfield | H04L 63/104 |

* cited by examiner

SYSTEM AND METHODS FOR USING A TRUSTED SINGLE WEB PORTAL FOR ACCESSING MULTIPLE WEB SERVICES

PRIORITY

The instant application is a continuation of International Application Number PCT/US20/33063 filed May 15, 2020, published as WO 2020/232336 which claims priority to U.S. Provisional Patent Application No. 62/848,228, filed May 15, 2019, titled System and Methods for Using a Trusted Single Web Portal for Accessing Multiple Web Services, which are incorporated in its entirety herein.

BACKGROUND

It has become apparent that as the number of accessible web services grows, the need to log into each one from a different location creates a cumbersome experience for the person using the web service. For example, to visit a bank, an online retailer, and an investment account, a person would have to visit each site separately and log into each site separately, presumably with different login credentials (if they are using good online security habits).

In addition to the burden of needing a username and password for each login entry point, the user must also trust that the website they are visiting is a legitimate site. Many phishing attacks rely on sending a person a link in an email that directs them to a malicious website. This fake website often looks identical to the real one. On the fake site, a user can be tricked into entering their login credentials. The perpetrators then use those login credentials to compromise the account at the real website.

There is a need for both convenience and security to reduce the burden of logins for individuals.

Eliminating passwords and providing a simple and secure login is needed to address the serious issues associated with usernames and passwords. The initial approach has been to retain the username and password and add a second factor to the authentication process such as SMS messages or OTPs (one-time passcodes). Another approach is to reduce the number of passwords by allowing for the use of a strong more secure password by setting up single sign-on (SSO) where a user signs in with one username and password. This approach created the additional risk that a hacker could gain broad access by guessing or stealing the username and password, thereby achieving access to not only one account but to multiple accounts.

Several previous patents cover using QR codes for authentication but differ from the methods described in this invention. Examples are U.S. Pat. Nos. 9,614,849, 8,342,392, and 8,677,116.

SUMMARY

Exemplary embodiments described herein include systems and methods including an authentication application. The authentication application may be registered to an authentication server and that is locked down. The application may be authenticated with the users' biometric for password-less authentication or with a knowledge factor such as a photo sequence, or password. The authentication application may be used to automatically obtain a one-time code. The one time code may be received by scanning a QR or by receiving the code by other means such as Bluetooth. The one time code may then be used to permit access into a secured resource to eliminate the need for a password that is dedicated to each individual secured resource and used for repeated authentication. In this instance, the application may be installed on a device owned by the user and the second factor of authentication may be either a knowledge factor or a biometric.

Exemplary embodiments of the systems and methods described herein may be used in the same manner as conventional username and password. The systems and methods described herein may be used to sign into multiple accounts by setting up an SSO portal protected with a QR sign-in or other one-time use code.

DRAWING

DETAILED DESCRIPTION

Figure 1:
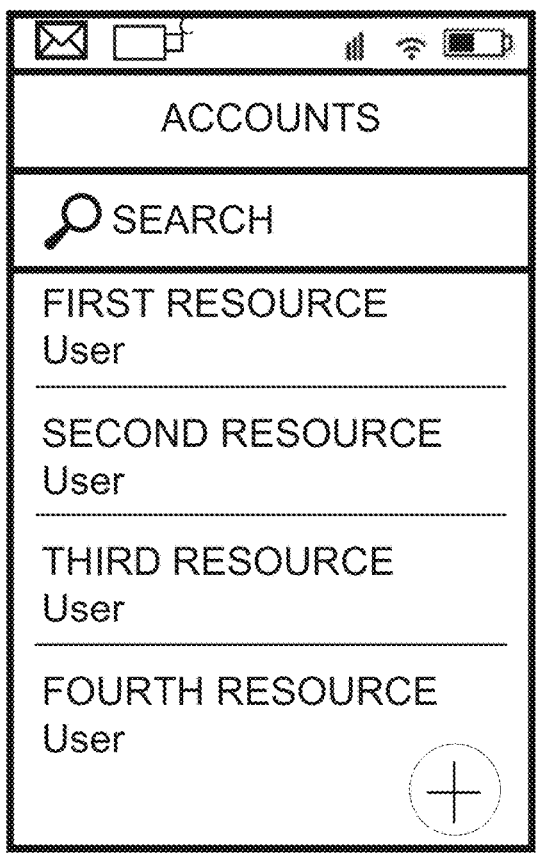
FIGS. 1-8 are exemplary user interfaces of a browser, portal application, and/or authentication application according to embodiments described herein.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments include systems and methods using a single trusted portal to log into a multitude of secure resources, such as services. In one instance, the portal may include an application that resides on a user's device that has been authenticated with the system. The application on the user's authenticated device may be configured with multiple accounts tied to individual secure resources, such as web services. The application may include a user interface to display one or more accounts and/or to permit the user to select an account from their authenticated device. The portal may then be configured to authenticate to a central identity provider. The user may then be permitted to use their authenticated device to obtain a one-time code controlled by the identity provider. In an exemplary embodiment, the one-time code is received by scanning a QR code presented on the trusted portal controlled by the identity provider. At some time, whether it is after scanning the QR code, or when launching the application, or making the selection of a desired account from the authenticated device, or at some other point in time, the application communicates the selected account to the identified provider. That selection of an account be with or separate from the transmission of the one-time code to the identity provider from the application. After scanning the QR code, or otherwise entering the one-time code with the authenticated device, the identity provider redirects the web browser to an endpoint at the appropriate web service where the login continues. The web service can verify the login attempt with the identity provider, such as through OpenID Connect, SAML, or other appropriate identity protocols. The user is logged into the default resource for that account. In one instance, the default resource may be one of an administrative portal. In one embodiment, the user may choose the resource to log into from a list displayed on the trusted portal or on the authenticator application prior to sending the one-time code to the authentication server This is not to be confused with federated login, or SSO. With federated login, a user uses one set of credentials to access a multitude of services. Here, a single portal is used for all logins; however, the credentials do not have to be the same. At this single portal, the user may choose an identity on your authentication device, the portal may then authenticate that identity, and the user assert that identity through the portal by providing the one-time use code, such as by scanning a QR on the login portal. The authentication device may contain numerous identities. Some of the identities may be tied to federated services and some may be single services.

Exemplary embodiments may include any combination of different aspects. The system may include an authentication application. The authentication application may be designed to have multiple accounts, each with separate credentials that are individually registered with the authentication server. The multiple resources may be registered to the authentication server and associated with an account. The single access portal may be set up for a user to securely access the authentication server from a computer browser or computer application. The authentication server may be programmed to generate a one-time code that is displayed to a user. The one-time-code may be displayed to a user in the form of a QR code by a computer browser or computer application. The one-time code may be available to be transferred from the computer browser or application to the authentication application by other communication methods, such as Bluetooth. The one-time code may be displayed to the user from the computer browser or application and entered by the user into the authentication application. In one embodiment, the authentication application may communicate the authentication attempt and optionally the one-time code to a second device, such as a smart watch. The authentication application may also be configured to permit the user to select an account for the resource that the user wants to access. The user can be authenticated to the authentication server for a single account. In an exemplary embodiment, the authentication server can match the one-time code and the user's securely connected browser and determine the authorization a user has to a secure resource. The authentication server can connect with the secured resource and provide the authorization tokens and user information for the secure resource to grant access to the user. The user's browser may thereafter be redirected to the secured resource and the user logged into the resources to which the user has been granted authorized access.

In an exemplary embodiment, the user can obtain the one-time code such as by scanning the one-time QR code with the authentication application and the authentication application can securely transmit the QR code data to the authentication server. Other means besides a QR such as a Bluetooth connection can be used to obtain and retransmit the one-time code. The one time code could be displayed and manually transferred to a selected account on the authentication device. Exemplary embodiments described herein may be in terms of a one-time code provided to the user as a QR code that may be scanned or imaged by the user. However, this embodiment is exemplary only. Any other transmission of the one-time code are within the scope of any embodiment in place of or in addition to the QR code.

Exemplary embodiments described herein may use systems and methods with a one-time code generated by an authentication server to be used to connect a user to the appropriate resource based on the account authenticated in an application on a device that has at least two accounts registered with an authentication server and in which the application access is locked down by at least a biometric or knowledge factor. Multi-factor authentication is achieved through possession of the registered device and either the biometric or the knowledge factor.

In one embodiment, in contrast to a default resource, the user could choose an account and an alternate resource within that account to access. They could then obtain the one-time code such as by a scan of a QR code from the single trusted portal to log them into that selected resource.

The figures represent the process of separately selecting two different accounts on a mobile authenticator application, authenticating to those accounts, and visiting a single known and trusted login portal. Using each authenticated account individually, when the user scans the QR code at the trusted portal, the user may be directed to a different resource depending on which authenticated account is being used to scan the QR code. Thus, one QR code login portal can direct the user to different resources depending on which authenticated account is being used to scan the code.

FIG. 1 shows an authentication application installed on a mobile device with multiple accounts associated with a user. To associate the one or more accounts with the authentication application, the user has been previously identity-proofed and given a registration code tied to their user account on a first server. This registration code represents their proofed identity. The code is entered into the authentication application. This code ties the authentication application to the user account on the first server. Each user account has permissions assigned to one or a plurality of service providers. Service providers may be, but are not limited to, web-based applications, workstation applications, or any other application requiring authentication to access its services. These may include physical services, such as a secure entry door. These may include virtual services, such as to conduct transactions on a web site.

This first server acts as an identity provider, whereby the authentication application can authenticate to the first server and be directed to a service provider associated with that user account. The service provider may be hosted on the first server or on a second server.

Figure 2:
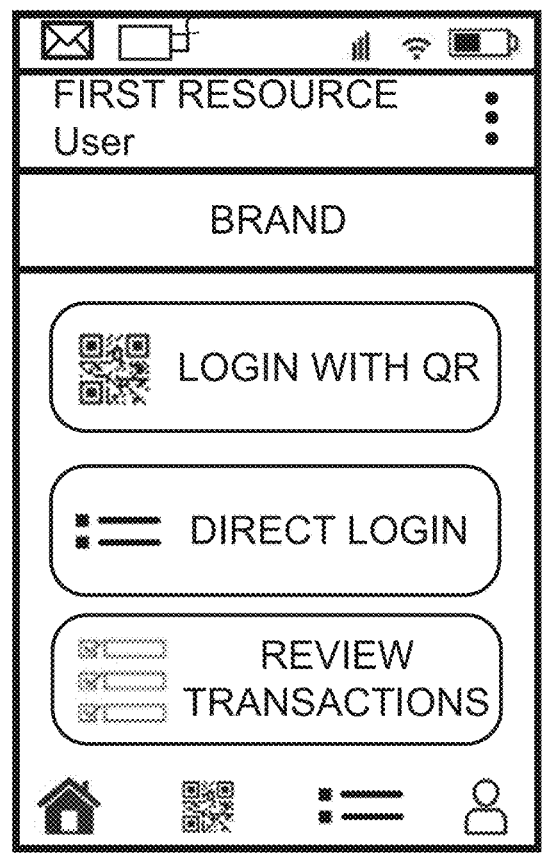

In FIG. 2, after the user has authenticated to an account, they may select a 'Login With QR' option. This opens a camera, allowing the user to scan a QR code on a web browser.

Figure 3:

In FIG. 3, there is a client web portal displaying a QR code. In one embodiment, this is a trusted web portal at a known URL. The user visits the login portal and a QR code is displayed. The user scans the QR code with their authenticated authentication application. The authentication application sends the QR code to the authentication server for verification along with the resource identifier or other indication of the desired secure resource. The selection of the desired resource may also be made or communicated from the application to the authentication server separate from and before the transmission of the one-time code, such as when the application is authenticated. The login portal may be polling the authentication server to know if the QR has been scanned. If the QR code was successfully scanned by an authenticated user, a redirect URI is passed back to the login portal client. The client redirects to the redirect URI, which is typically an authentication endpoint at the resource server. The resource server then verifies the login attempt with the authentication server. If the login attempt is found to be valid, the user is logged into the resource with the appropriate authorizations.

Figure 4:
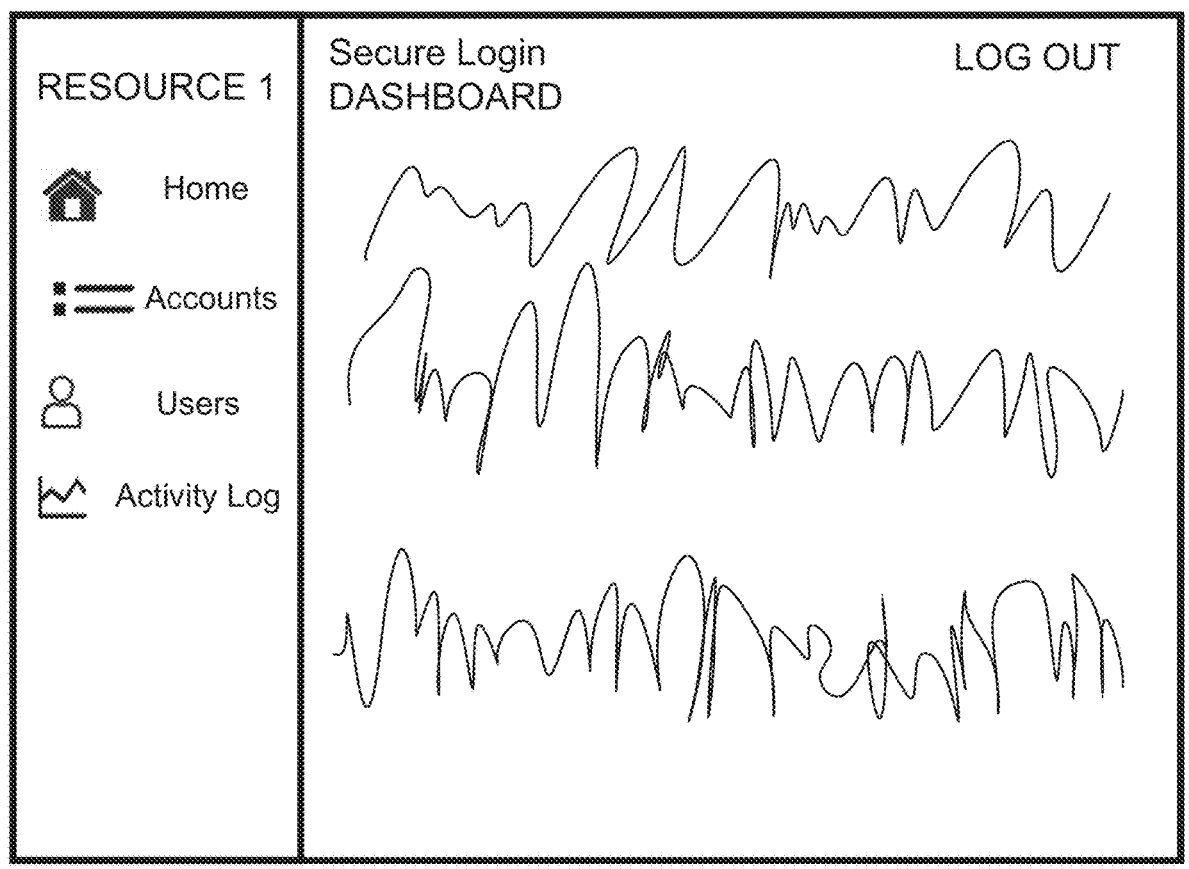

FIG. 4 represents the client web view of the user who has successfully logged into the secured resource. Here the resource is represented by, but not limited to, an administrative portal for an account to set resources and/or users. Exemplary embodiments may be an administrative portal of embodiments described herein.

Figure 5:
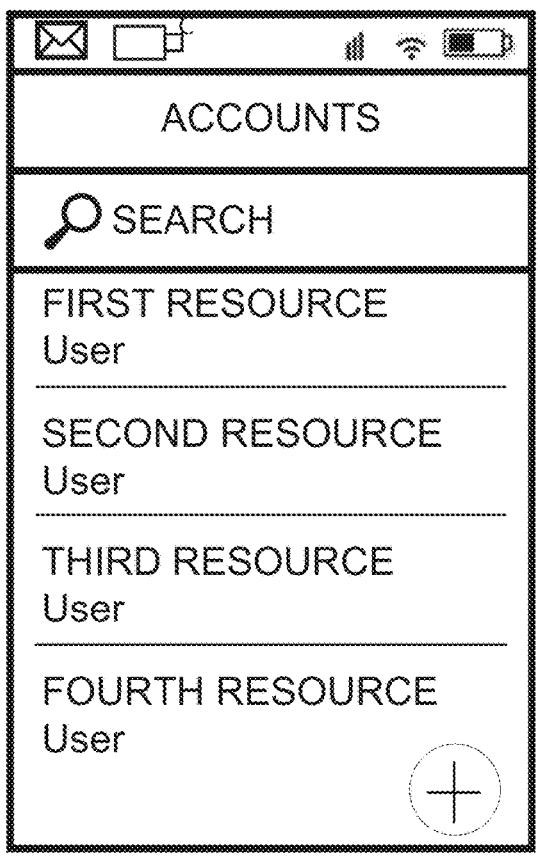
Figure 6:
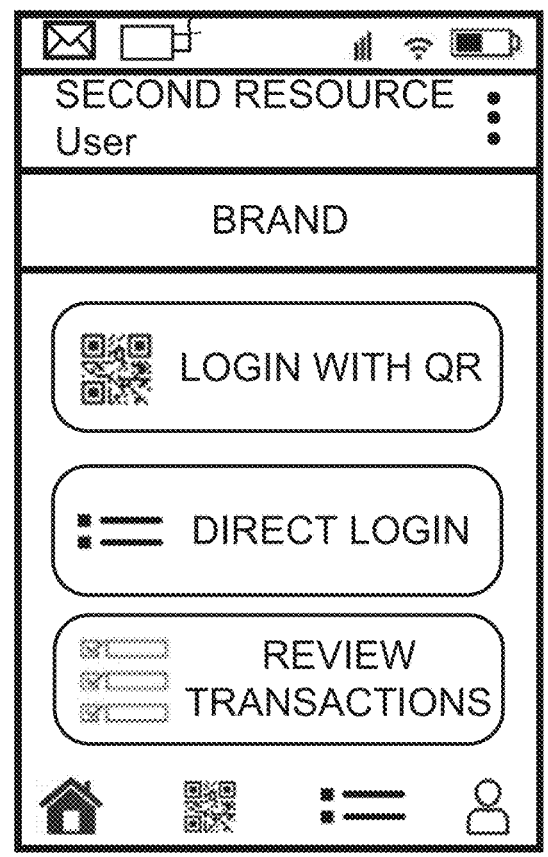

FIG. 5 represents the same account selection process as explained in FIG. 1, but here a different account is selected in FIG. 6.

Figure 7:

FIG. 7 represents the same trusted login portal at the same known URL as the one explained in FIG. 3. Here the user scans the QR code at the known trusted portal using a different account than the one chosen in FIG. 1.

Figure 8:
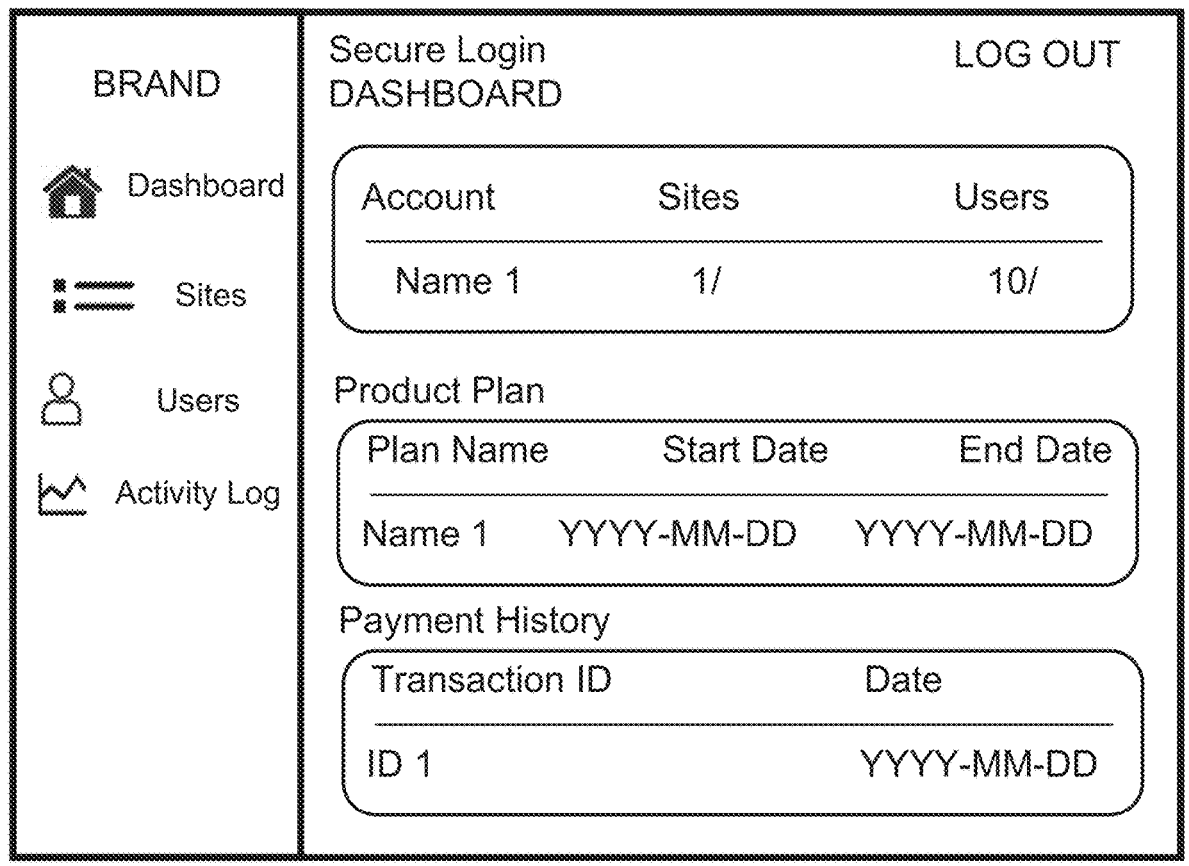

FIG. 8 depicts the user signed into a different secured resource from that in FIG. 3.

Figure 9:
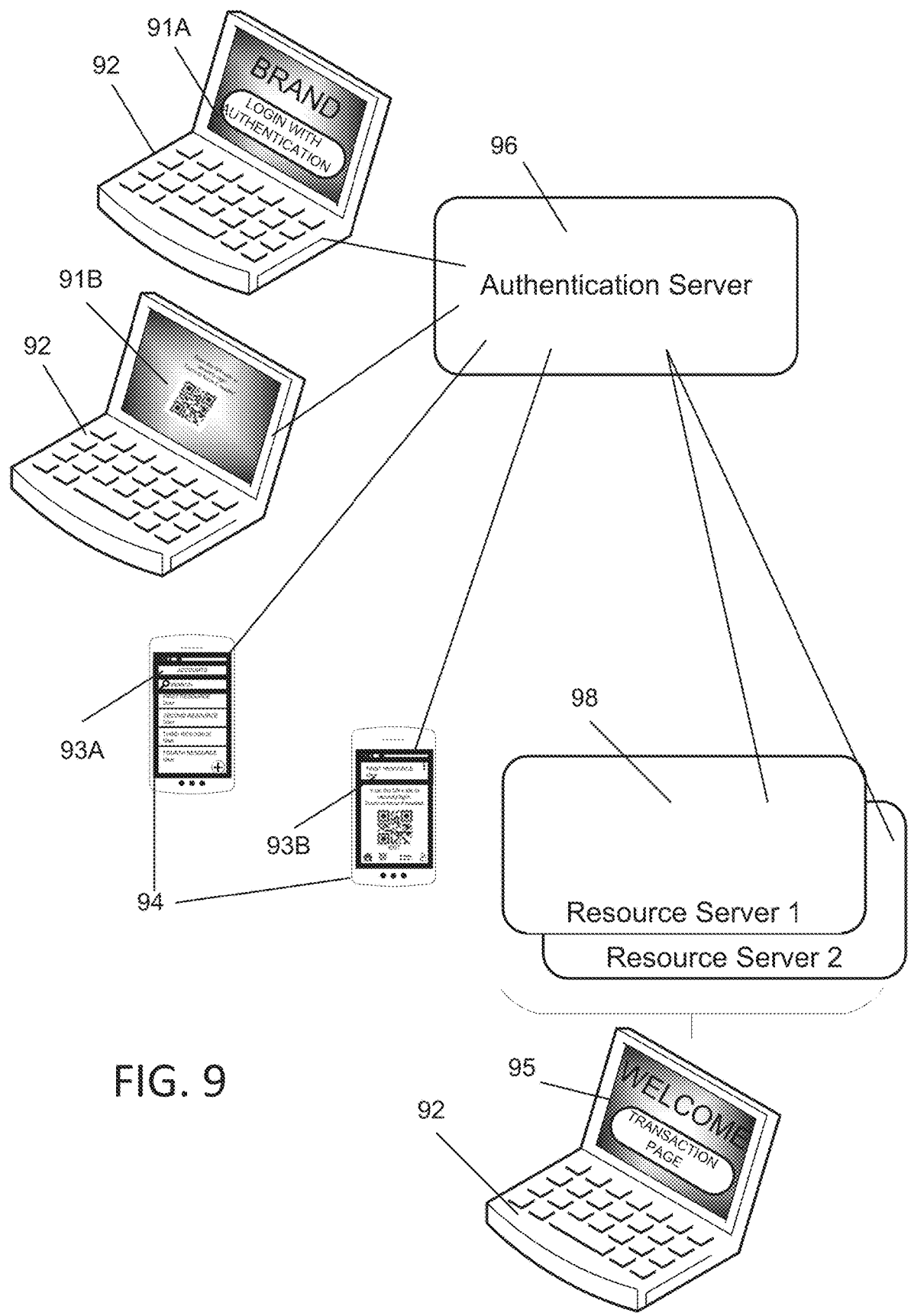
FIG. 9 illustrates an exemplary system diagram according to exemplary embodiments described herein.

FIG. 9 illustrates an exemplary system for multi-resource logins with resource selected by a single platform application. The system comprises a single platform application that may be accessed through a browser, such as through a website, or may be a downloadable application stored on an electronic device 92. Either way, the system comprises a platform application configured to communicate with an authentication server 96. The system may also include an authentication server 96 and an authentication application on a user's electronic device 94. The user's electronic device may be a mobile device that is retained with the user, such that it may act as a level of authentication as an object in possession of the user. The user's electronic device may be a mobile phone. The user's electronic device may also be any electronic device including a user interface for sending and receiving information. For example, the user's electronic device 94 may include a screen and a camera for imaging a QR code, and a communication portal for communicating with the authentication server. The user's electronic device may include an authentication application saved in memory of the electronic device that is executed by a processor of the electronic device performs functions described herein including displaying a user interface to a user and receiving inputs from the user to select a desired secure resource and for receiving and communicating the one-time code to the authentication server.

In an exemplary embodiment, the single platform application comprises a program that is run through a user's browser on an electronic device 92. The electronic device may by any computer device having a screen and configured to communicate over a network to a server.

The electronic device 92 may include a web browser that permits a user to enter a URL to navigate to a website. The universal access portal 91A may be displayed on the screen of the electronic device 92. The single platform application may be configured to display a one-time code on a display of an electronic device. As illustrated, the user display 91B of the single platform application includes a QR code. The single platform application receives the one-time code from the authentication server 96 and displays the one-time code on the display of the electronic device 92. As described herein, the one-time code may be communicated according to other embodiments, such as through Bluetooth, etc.

In an exemplary embodiment, the authentication program comprises a program that is stored on a user's electronic device 94 that is configured to display a user interface on a user's display. The authentication program is configured to be launched on the user's electronic device and display a user interface to a user. The user interface 93A is configured to display a plurality of secure resources associated with the user. The authentication program is configured to receive an input from a user selecting a desired secure resource from the plurality of secure resources associated with the user. The selection of a desired secure resource from the plurality of secure resources from the authentication application on the mobile device is then received by the authentication server. This may happen when the user logs into the authentication program and selects a resource, or may occur later, as described herein, when the authentication program returns the one-time code.

After a user selects a desired secure access, the authentication program is configured to receive the one-time code that is provided by the single platform application. As described herein, the authentication program may receive the one-time code in many alternative ways. For example, the electronic device 94 may include a camera and the authentication program is configured to access the camera and request a user image the one-time code displayed from the single platform application. The authentication application may also include a user input for the user to type in the one-time code. Other communication methods may be used such that the electronic device 92 supporting the single platform application may directly communicate with the electronic device 94 supporting the authentication application such as through Bluetooth.

In an exemplary embodiment, the authentication server 96 is configured to receive the one-time code from the user's electronic device 94 and a desired secure resource as selected by a user. The authentication server 96 is then configured to verify the user through the one-time code. The authentication server 96 may also receive one or more other credential for further authentication. For example, the biometric received to launch the authentication application may also be sent to the authentication server and also authenticate the user with the authentication server. Other authentication methods may also be used, such as receiving information from the electronic device 94.

In an exemplary embodiment, the one-time code is generated by the authentication server and displayed to the user through the single portal application or communicated to the user's electronic device through the single portal application and authentication application. In an exemplary embodiment, the authentication server associates a time duration with the one-time code. Therefore, a one-time code may time out if the authentication server 96 does not receive the one-time code from the authentication application within a set time duration. The system may then be configured to alert the user that the log in attempt has timed out. The single portal application may then be configured to permit a user to request another authentication session.

In an exemplary embodiment, another layer of authentication may be included in accessing the authentication application on the user's electronic device 94. For example, a user may enter a user name and password. Other authentication methods may also be used, such as receiving a biometric input. The authentication application may communicate with the authentication server 96 to verify the credential received from the authentication application.

During a set up stage, a user through the single platform application or the authentication application may register an electronic device with the system and/or associate secure resources to the user. The setup may therefore include associating the user and/or a mobile device associated with the user to the authentication server. The setup may include associating the resource server with the authentication server.

In an exemplary embodiment, after the user has been authenticated to the authentication server and the authentication server has received a selection from the user for a desired secure resource and the one-time code, the authentication server is configured to communicate to the resource server 98 associated with the desired secure resource. The authentication server 96 may provide the resource server associated with the desired secure resource desired security and user identity in place of the convention user credentials of a user name and password. The authentication server may therefore replace any combination of user names and passwords associated with any number of secure resources.

The single portal application may be configured to redirect the browser to the website associated with the desired secure resource. The redirect URI may be used in place of the conventional user name and password and achieve a direct log in into the secure resource. For example, the system may log the user into the resource server using an identity protocol. The identity protocol may be, for example, one of SAML, OpenID Connect, or WebAuthn.

In an alternative embodiment, the system may log the user into the resource server with credentials saved for the desired secure resource without entry of the credentials by the user at the time of logging in the user. For example, the authentication program may save a plurality of credentials, where each credential is associated with a specified secure resource. Upon selection by the user, the credential associated with the selected secure resource may be communicated from the authentication application to the resource server, with or without the authentication server. The plurality of credentials may be stored at the resource server such that a selection by the user may be communicated from the authentication application to indicate which credential from the authentication server should be used with the resource server.

The electronic device 92 may then include a user interface 95 of the desired secure resource after the user has been authenticated with the resource server of the desired secure resource. The user may therefore be logged into the desired secure resource through the resource server associated with the desired secure resource without having entered a user name or password or any other credential directly associated with the desired secure resource.

Exemplary embodiments therefore include a single website interface having a single URL for accessing a plurality of secure resources. The same URL may be used regardless of the desired secure resource to be accessed. The selection of the secure resource may be through a device separate from the one used to actually encounter or communicate with the secure resource.

Figure 10:
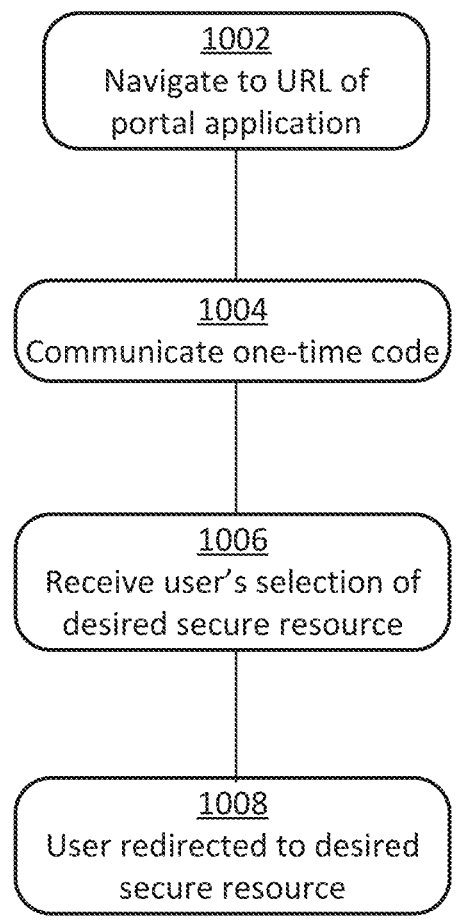
FIG. 10 illustrates an exemplary flow diagram according to embodiments described herein.

Exemplary embodiments include methods of authenticating a user to a secure resource through a single portal application. FIG. 10 illustrates an exemplary flow diagram for methods according to embodiments described herein. In Step 1002, the user opens a browser and uses the URL for the portal application to obtain a one-time code, such as a QR code that provides universal access. In Step 1004, the one-time code is communicated to the user, and the user sends the one-time code back to the system. In an exemplary embodiment, the one-time code is communicated to the user through a first electronic device, and the user returns the one-time code back through a second electronic device, different than the first electronic device. As previously described, a QR code may be displayed on the user's computer screen, and the user may image the QR code with an application resident on their mobile phone. In Step 1006, the user selects the account for the resource they want to access and authenticates with the authentication server. The authentication server receives the user selection from the authentication application. In Step 1008, the desired secure resource is displayed to the user after the user has been authenticated and logged into the desired secure resource. The authentication process, except for providing a knowledge factor or a biometric to launch the authentication application, may not be visible to the user. Note that Step 1006 can proceed prior to Step 1002 or 1004. Transparent to the user, the QR one-time data is sent to the authentication server in a packet with the session ID created in Step 1004. From the user's perspective, Step 1008 is access to the secured resource material on their computer. The user may therefore only experience, navigating to a single URL, launching an authentication application on their mobile device, selecting a desired secure resource, and image the QR code displayed on the electronic device used to navigate to the desired secure resource. The user therefore does not have to enter specific user credentials associated with the desired secure resource.

Figure 11:
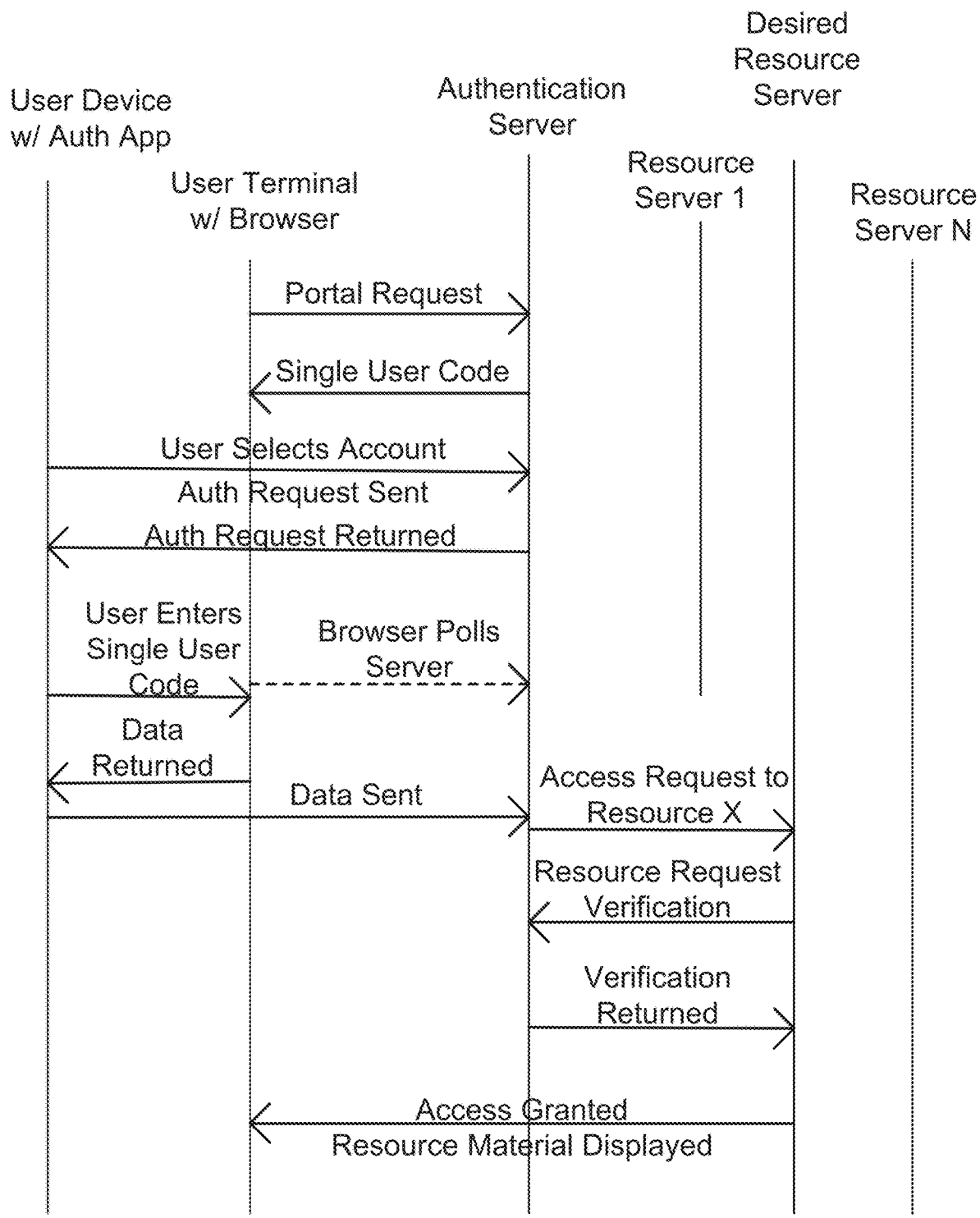
FIG. 11 illustrates an exemplary process according to embodiments described herein.

FIG. 11 illustrates an exemplary swim lane diagram of the process which provides more details of the actual process flow. As above, the user can start with either their authentication device or with the computer on which they want to work for accessing the desired secure resource. In FIG. 10, the process starts when the user opens an application or a browser that opens a connection to the authentication server and sends a request for an access code from a first electronic device. This connection should be secured, such as with an HTTPS connection.

In an exemplary embodiment, the access code is a one-time code presented as a QR on the first electronic device. The user then uses the authentication device (second electronic device) to authenticate to the authentication server. The system has to have been previously set up such that a user device is registered to the authentication server, and a user is associated to each account and the user has to have been authorized by an account admin or registration process to have authorization for each resource to be accessed. The authentication device may serve as one factor of the multi-factor process. A biometric or knowledge factor used to launch the authentication application may serve as a second factor of authentication. The biometric or knowledge factor may be entered into the authentication application and sent to the authentication server. The biometric or knowledge factor may be entered into the authentication application and authenticated locally by the authentication device. These factors, plus geo-fencing, can be combined to have 2, 3 or 4-factor authentication. Once the device and/or user is authenticated through the authentication application on the authentication device (second electronic device), the user can scan the presented QR. Multiple processes known in the art for securing authentication of a device can be used to secure the authentication process such as certificate pinning and challenge-response nonces. Also, the QR presentation and scanning to transmit a code can be replaced in the process by other methods such as received by Bluetooth, near field and other means to transfer a code from the first electronic device to the second electronic device. Once the one-time code is obtained on the user's authentication device, the one-time code is communicated from the user's authentication device to the authentication server along with a session ID or user ID. The authentication server matches the session ID with the user authentication session and matches the QR access code with the resource that the user is seeking to access. At the same time, the browser may be polling the authentication server at a predetermined interval to check if the QR has been scanned. Once the QR has been scanned by an authenticated device with the allowed authorizations for the resource, the authentication to the resource server continues. In some embodiments, the authentication server returns one of a SAML assertion, OIDC authorization, or an OAuth authorization to the browser. The SAML, OpenID Connect, and OAuth protocols provide for authentication and authorization of the user to the resource. They allow for the redirection to the user's authenticated resource by the application or browser that is requesting access to the secured resource.

In an exemplary embodiment, authenticated device may, through the authentication program, permit local storage of the plurality of secure resources and/or the associated credentials for each of the plurality of secure resources. In an exemplary embodiment, the associated credentials for each of the plurality of secure resources may be stored on the authentication server. If the associated credentials are stored on the authenticated device, the authenticated device may communicate the credential associated with the desired secure resource to the authentication server to be passed onto the resource server associated with the desired secure resource.

The user's device has different credentials created during the registration process for each account resource to which they have access. In some cases, the account resource is an SSO (single sign-on portal) providing access to multiple resources that use the same credentials. The advantage of this invention is that from the user's perspective, even when different credentials are required by the resource, the sign-in process is the same for each resource. When both a biometric and a user device are used, it appears to the user that the same credentials are used but the device is providing multiple credentials. When a knowledge factor is used, the same or a different knowledge factor can be set up during the registration process. An example would be using the TraitWare PhotoAuth® process in which the user can select either the same array of pictures and same set of pictures or a different array or different pictures.

Another advantage to the user is that only one URL has to be known or bookmarked to have access to multiple digitally secured resources, whether it be a physical or a digital resource.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "first," "second," "third," and so on may be used to describe separate components. These terms may also be used to indicate different functions that may be performed by different or the same component parts. For example, as described herein a first resource server and a second resource server are provided. These are used to indicate servers for different secure resources that a user may log into and/or for which the platform is configured to log in the user. However, these servers may be the same server or may be different servers. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

When used in this specification and claims, the terms "comprises" and "comprising" and variations thereof mean that the specified features, steps or integers are included. The terms are not to be interpreted to exclude the presence of other features, steps or components.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of authenticating a user, comprising:
providing an authentication application installed on a mobile device, the authentication application having a plurality of secure resources associated with the user;
providing through a web browser a platform application to permit the user to request access to an account hosted by a service provider, the platform application is different from the authentication application installed on the mobile device;
displaying on the web browser through the platform application a one-time code;
receiving a selection of a desired secure resource from the plurality of secure resources from the authentication application on the mobile device;
receiving the one-time code through the authentication application;
receiving the one-time code from the authentication application at an authentication server for verification of the one-time code; and
sending a redirect universal resource identifier (URI) to the platform application on the web browser when the one-time code is verified, the URI associated with the desired secure resource.

2. The method of claim 1, wherein the one-time code is displayed as a QR code on a display of a first electronic device, the first electronic device is different than the mobile device.

3. The method of claim 2, wherein the receiving the one-time code through the authentication application is by receiving an image if the QR code displayed on the first electronic device from the mobile device.

4. The method of claim 1, the displaying on the web browser the one-time code further comprising receiving the one-time code from the authentication server.

5. The method of claim 4, after verifying the one-time code with the authentication server, sending log in credentials to a resource server associated with the desired secure resource without entry of the log in credentials by the user during an authentication session.

6. The method of claim 1, further comprising associating a plurality of secure resources through the multiple accounts of the user to the authentication application by:
authenticating the identity of the user, providing a code to the user from a first server associated with a first one of the multiple accounts, and receiving the code from the user through the authentication application.

7. The method of claim 6, further comprising directing the portal application to a service provider by the first server associated with the first one of the multiple accounts.

8. The method of claim 7, wherein the service provider is hosted on the first server.

9. The method of claim 1, wherein the one-time code is a QR code and the receiving the one-time code is by the authentication application launching a camera of the mobile device and taking an image with the camera of the QR code displayed on the web browser.

10. The method of claim 9, further comprising polling by the portal application to receive are direct URI from the authentication server.

11. The method of claim 10, wherein the redirect URI is the authentication endpoint at the resource server associated with the desired secure resource.

12. The method of claim 11, further comprising logging in the user into the resource server with credentials saved for the desired secure resource without entry of the credentials by the user at the time of logging in the user.

13. The method of claim 12, further comprising associating multiple accounts of the user to the authentication application by: authenticating the identity of the user, providing a second code to the user from a third server associated with a second one of the multiple accounts, and receiving the code from the user through the authentication application.

14. The method of claim 13, further comprising directing the portal application to a second service provider by the third server associated with the second one of the multiple accounts.

15. The method of claim 14, wherein the web browser is configured to present a same portal application to request access to different accounts hosted by different service providers corresponding to the multiple accounts associated with the user, and the user is directed to a selected one of the different service providers based on the selecting of the one of the multiple accounts associated with the user through the authentication application on the mobile device.

16. The method of claim 11, further comprising logging in the user into the resource server using an identity protocol.

17. The method of claim 16, wherein the identity protocol is one of SAML, OpenID Connect, or Web Authn.

18. The method of claim 16, further comprising logging in the user into the resource server without entry of any credentials specific to the desired secure resource by the user at the time of logging in the user.

19. The method of claim 1, further comprising displaying through the authentication application on a display of the mobile device the plurality of secure resources associated with the user, and receiving the selection of the desired secure resource comprises receiving a user input on the mobile device selecting the desired secure resource from the plurality of secure resources displayed on the mobile device.

20. The method of claim 19, wherein the authentication application having the plurality of secure resources associated with the user comprises having at least a first account associated with the user from a first server associated with a first service provider and having at least a second account associated with the user from a second server associated with a second service provider, wherein the first service provider is different from the second service provider, and the display of the plurality of secure resources includes at least the first account and at least the second account and the desired secure resource is the first account or the second account.

21. The method of claim 20, wherein the at least the first account comprises permissions assigned to the first service provider and the at least the second account comprises permissions assigned to the second service provider.

22. The method of claim 21, after verifying the one-time code with the authentication server, sending log in credentials to a resource server associated with the desired secure resource without entry of the log in credentials by the user during an authentication session, wherein the log in credentials and the resource server are either the permissions assigned to the first service provider and the first server or the permissions assigned to the second service provider and the second server depending on whether the desired secure resource is the first account or the second account.

23. The method of claim 22, wherein the web browser is configured to present a same portal application to request access to different accounts hosted by different service providers corresponding to the multiple accounts associated with the user, and the user is directed through web browser to the resource server associated with the desired secure resource based on the selecting of the one of the multiple accounts associated with the user through the authentication application on the mobile device.

* * * * *